E. MENZ.
SPRING WEIGHING SCALE.
APPLICATION FILED NOV. 21, 1913.
1,141,722.
Patented June 1, 1915.
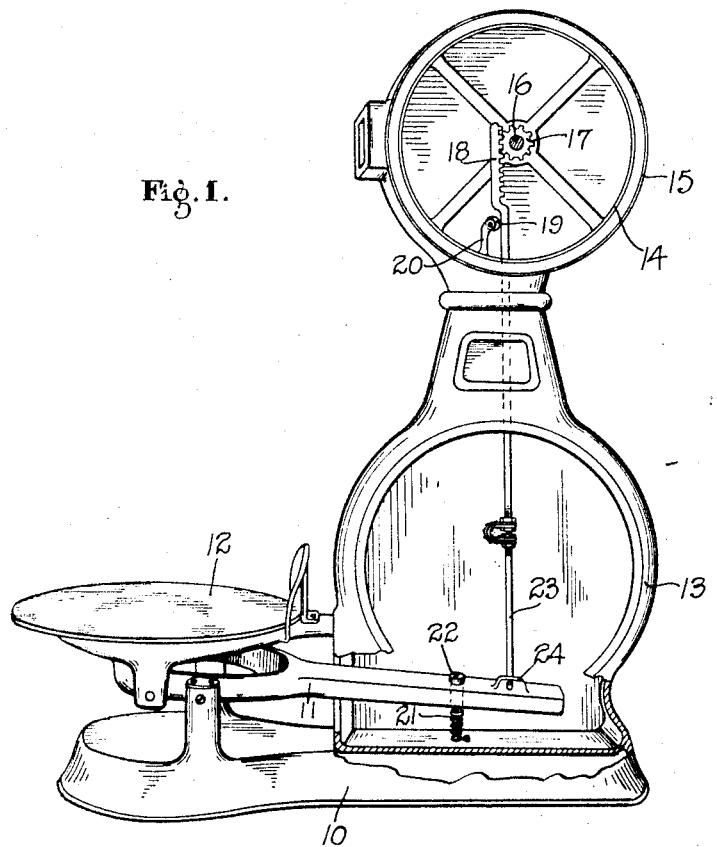
Fig. 1.
Fig. 2.
Fig. 3.
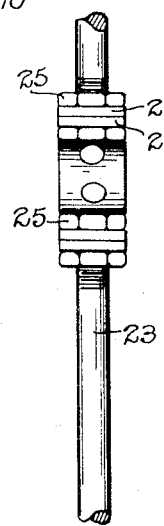
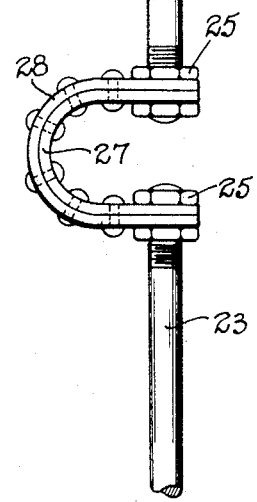
WITNESSES:
J. H. Wells
O. M. McLaughlin
INVENTOR.
Emil Menz
BY V. H. Lockwood
ATTORNEY.

UNITED STATES PATENT OFFICE.

EMIL MENZ, OF HAMILTON, OHIO, ASSIGNOR, BY MESNE ASSIGNMENTS, TO THE COMPUTING SCALE COMPANY, OF DAYTON, OHIO, A CORPORATION.

SPRING WEIGHING-SCALE.

1,141,722.  Specification of Letters Patent.  Patented June 1, 1915.

Application filed November 21, 1913. Serial No. 802,298.

*To all whom it may concern:*

Be it known that I, EMIL MENZ, a citizen of the United States, and a resident of Hamilton, county of Butler, and State of Ohio, have invented a certain new and useful Spring Weighing-Scale; and I do hereby declare that the following is a full, clear, and exact description thereof, reference being had to the accompanying drawings, in which like letters refer to like parts.

The object of this invention is to improve the construction of spring controlled barrel scales so that the same will automatically adjust and accommodate itself to temperature changes so as to have at all times uniformity of operation and indication.

The chief feature of the invention consists in providing a thermostat in or as a part of the rack bar by which the drum is actuated by the scale beam. In other words, the rack bar is formed of two parts secured rigidly to a thermostat located between said parts, so as to vary the length of the rack bar to offset the variations of the spring.

The full nature of the invention will be understood from the accompanying drawings and the following description and claims.

In the drawings, Figure 1 is a side elevation of such a scale with parts in section. Fig. 2 is an elevation of a portion of the rack bar containing a thermostat. Fig. 3 is a rear elevation of the central part of Fig. 2.

In the drawings 10 represents a base, 11 the scale beam, 12 the platform, 13 the housing, 14 the drum and 15 the drum housing. On a drum shaft 16 there is a pinion 17 with which the upper end of the rack bar 18 meshes, said rack bar being held in place by a roller 19 on an arm 20 secured to the drum housing, or by any other well known means, as this constitutes no part of the invention.

The scale beam 11 is controlled by a spring 21 which is secured to the base and also the bottom of the housing and also is secured to the scale beam by an adjusting screw 22. The lower end 23 of the rack bar is pivoted to an ear 24 on the scale beam.

The adjacent ends of the two portions 18 and 23 of the rack bar are rigidly secured to a thermostat by screwing therein and being held thereon by nuts 25, and so that the portions of the rack bar will be in alinement with each other. The particular thermostat herein shown is of horse shoe shape with an inner brass member 27 and an outer steel member 28 riveted together and the free ends secured to the members of the rack bar. With this arrangement under influence of heat the thermostat will contract and shorten the length of the rack bar to oppose the expansion of the spring and cold will expand the thermostat and increase the length of the rack bar to offset the contraction of the spring.

I claim:

1. In a weighing scale having a housing, a beam, a base, a spring between the beam and the base for controlling the beam, a drum, a rack bar extending from the beam to the drum for operating it, said rack bar consisting of two separate portions in alinement with each other, and a thermostat between said portions and secured rigidly thereto.

2. In a weighing scale having a housing, a beam, a base, a spring between the beam and the base for controlling the beam, a drum, a rack bar extending from the beam to the drum for operating it, said rack bar consisting of two separate portions in alinement with each other, a thermostat consisting of a horse-shoe-shaped steel bar and a brass horse-shoe-shaped bar within the steel bar and rigidly secured thereto, and means for securing the ends of the portions of the rack bar to the ends of the thermostat, whereby the thermostat becomes a part of the rack bar.

In witness whereof, I have hereunto affixed my signature in the presence of the witnesses herein named.

EMIL MENZ.

Witnesses:
H. EASTMAN,
JNO. L. JACKSON.